(12) United States Patent
Maddock

(10) Patent No.: US 7,785,229 B2
(45) Date of Patent: Aug. 31, 2010

(54) VARIABLE K-FACTOR TORQUE CONVERTER

(75) Inventor: Donald G. Maddock, Ypsilanti, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 522 days.

(21) Appl. No.: 11/674,721

(22) Filed: Feb. 14, 2007

(65) Prior Publication Data

US 2008/0194381 A1 Aug. 14, 2008

(51) Int. Cl.
  *F16D 33/00* (2006.01)
  *F16H 61/58* (2006.01)
  *F16H 61/52* (2006.01)

(52) U.S. Cl. ............................. 477/62; 477/66; 60/341; 60/342

(58) Field of Classification Search .................. 477/53, 477/62, 66; 60/341, 342
See application file for complete search history.

(56) References Cited

U.S. PATENT DOCUMENTS

| | | | | |
|---|---|---|---|---|
| 2,954,672 A | * | 10/1960 | Mamo | 60/341 |
| 3,090,252 A | * | 5/1963 | Mamo | 475/39 |
| 3,385,060 A | * | 5/1968 | Lazarus | 60/341 |
| 3,461,670 A | * | 8/1969 | Waclawek | 60/343 |
| 3,848,409 A | * | 11/1974 | Waclawek | 60/345 |
| 3,886,729 A | * | 6/1975 | Amann et al. | 60/39.24 |
| 4,180,977 A | | 1/1980 | Beardmore | |
| 5,093,789 A | * | 3/1992 | Yoshimura et al. | 701/58 |

FOREIGN PATENT DOCUMENTS

DE 10248254 A1 4/2004

* cited by examiner

*Primary Examiner*—Tisha D Lewis
(74) *Attorney, Agent, or Firm*—Quinn Law Group, PLLC

(57) ABSTRACT

A controllable hydrodynamic torque converter is provided for use within a vehicle having a detectable throttle level, the torque converter comprising a first stator having a first outlet angle and a second stator having a higher second outlet angle. The second stator is selectively engageable with the first stator using a hydraulic clutch to thereby vary the torque converter K-factor during idle and high-throttle conditions, and is permitted to freewheel during low or part throttle conditions. The first outlet angle is at least five degrees lower than the second outlet angle. A vehicle is also provided including an engine having an engine torque and a detectable throttle level, a transmission, a torque converter operable to transmit the engine torque to the transmission and having a stator assembly with two stators, a selectively controllable clutch, and a controller configured to selectively actuate the clutch to vary the K-factor depending on the throttle level.

13 Claims, 2 Drawing Sheets

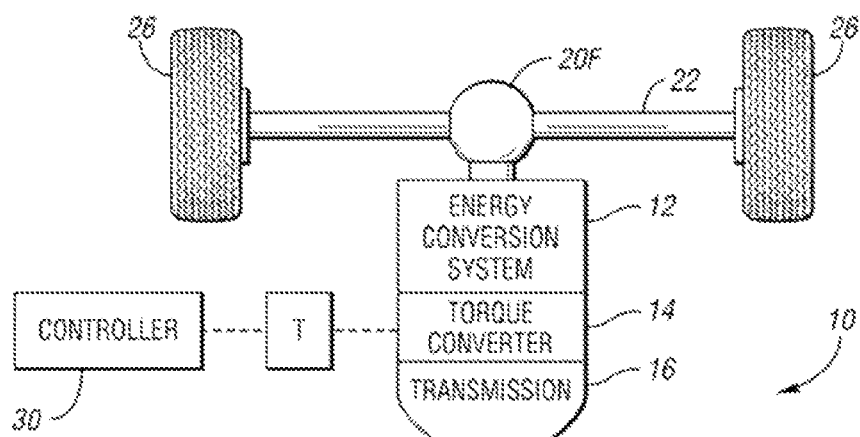
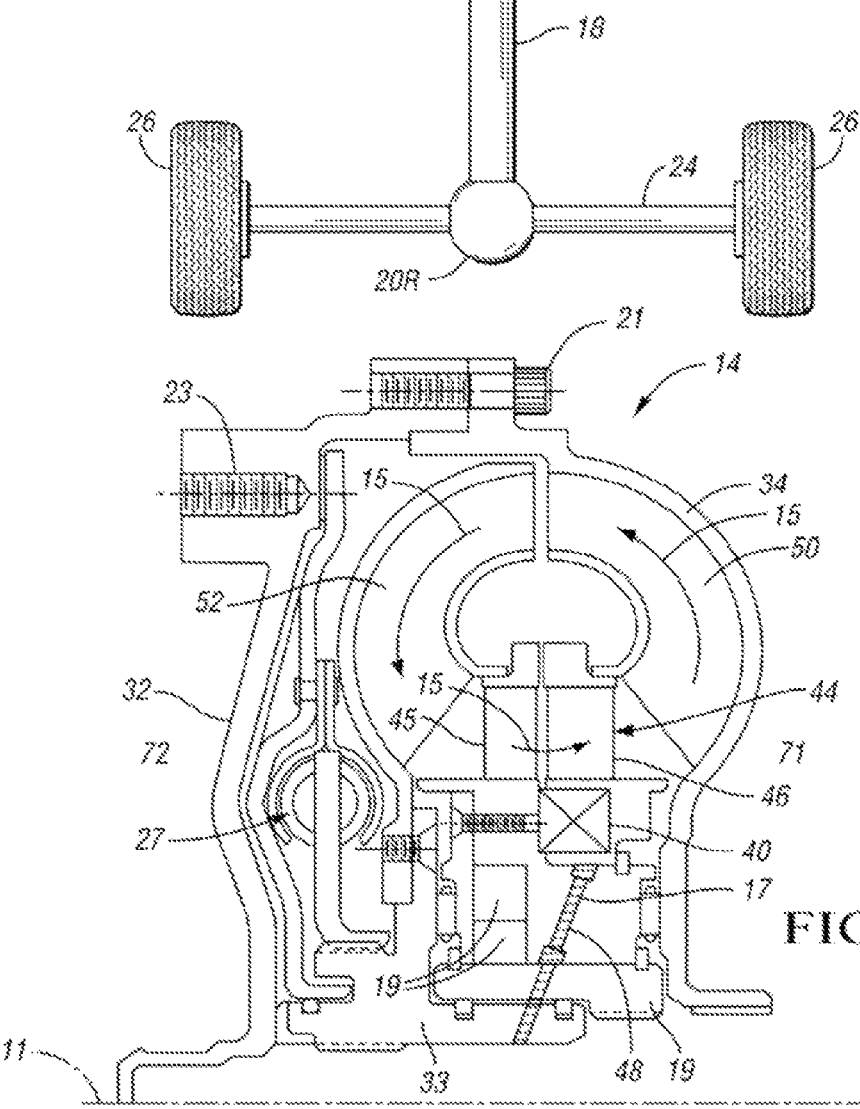

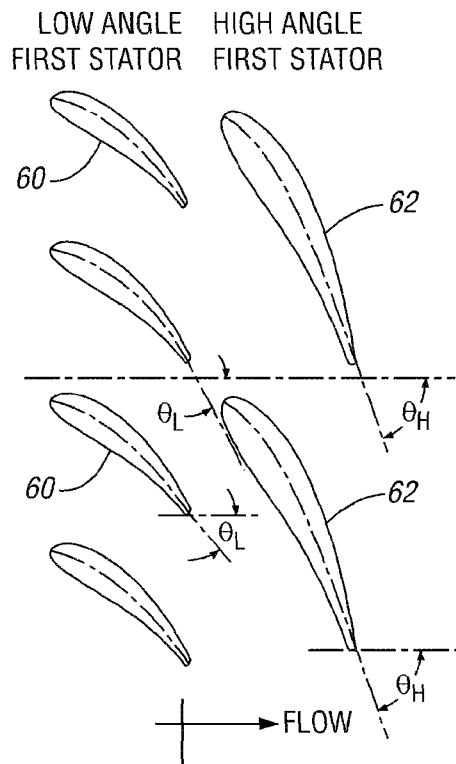
FIG. 3
FIG. 4
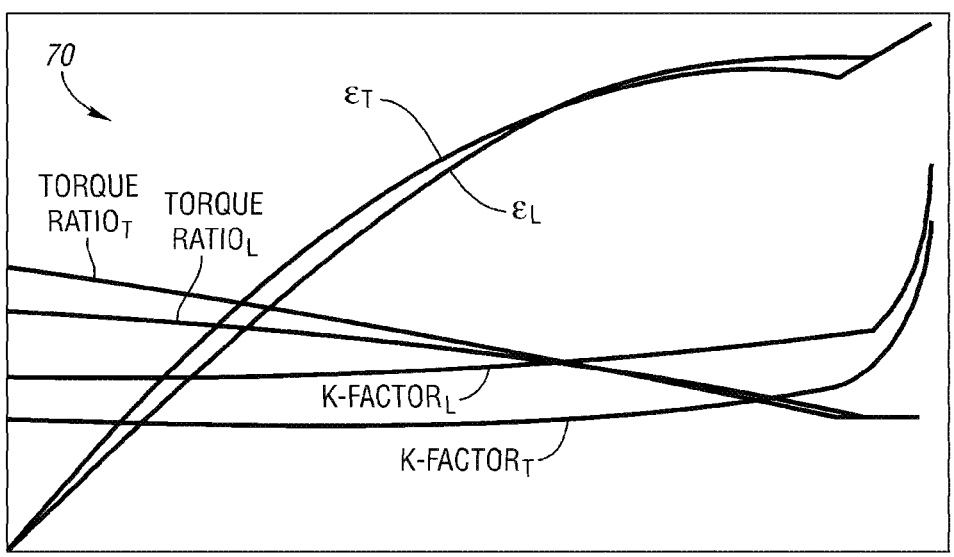
FIG. 5
| MODE/THROTTLE POSITION | CLUTCH 40 | FIRST STATOR 45 | SECOND STATOR 46 |
|---|---|---|---|
| (1) IDLE | X | X | X |
| (2) LOW/PART THROTTLE | O | X | O FREEWHEEL |
| (3) HIGH THROTTLE | X | X | X |

VARIABLE K-FACTOR TORQUE CONVERTER

TECHNICAL FIELD

This invention relates generally to a controllable hydrodynamic torque converter, and in particular to a hydrodynamic torque converter having two controllable stators configured with different outlet angles for selectively varying the torque converter K-factor.

BACKGROUND OF THE INVENTION

Automatic power transmissions used in modern vehicles typically utilize a multi-function turbomachine or device commonly referred to as a hydrodynamic torque converter. A hydrodynamic torque converter is used to automatically disengage a rotating engine crankshaft from a transmission input shaft during vehicle idling conditions to enable the vehicle to stop and/or to shift gears without stalling. Additionally, the torque converter is used as a torque multiplier for multiplying engine torque in the lower vehicle speed range until the vehicle speed nearly matches the engine speed.

Within a torque converter, a number of specially constructed internal components combine to enable an efficient fluid coupling effect between the disparately rotating engine and transmission shafts. In particular, a standard or conventional torque converter consists of an engine-driven pump or impeller, which is the driving member of the torque converter giving impetus to a stream of hydraulic fluid. The pump is connected to the engine crankshaft and therefore rotates in unison with the engine, thereby accelerating a supply of hydraulic fluid and directing the accelerated fluid to the second component, the turbine. The turbine, which is driven by the accelerated fluid discharged by the pump, is typically splined to a transmission input shaft and converts the fluid energy imparted by the fluid stream into useable mechanical energy, which is transmitted to the splined transmission input shaft to propel the vehicle. Finally, a stationary member or stator is included within the torque converter for redirecting the fluid stream between the pump and turbine. The stator is connected to a fixed reaction shaft through a one-way clutch that allows the stator to free-wheel when torque multiplication is no longer possible.

Torque converters are designed to slip at lower vehicle speeds in order to enable the transmission to rotate at a slower rate than the coupled engine, with the slip rate gradually diminishing as the vehicle is accelerated. Effectively, the torque converter holds the engine speed nearly constant, allowing the transmission speed to gradually reach or approach the engine speed as the vehicle accelerates. The torque converter input speed, identical with the engine speed and stated in revolutions per minute, is an important design factor that is substantially affected by the outlet angle of the stator. The outlet angle is primarily determined by the configuration or construction of a plurality of stator blades within the stator. However, the torque converter input speed depends in large part on the engine output torque, and therefore a more descriptive variable, the "K-factor", is usually used to rate or describe an individual torque converter. K-factor refers to the input speed divided by the square root of the engine torque, as measured at any torque converter operating point. The operating point of a torque converter is most conveniently defined by the ratio of the output speed to the input speed of the torque converter. This parameter or variable is known as the torque converter speed ratio.

Vehicle fuel economy and performance is enhanced when the operating or performance characteristics of a given torque converter are automatically optimized. While a variable-blade angle stator may be used, wherein individual piston-actuated stator blades are allowed to pivot on shafts running from shell to core in order to adjust the stator blade position and angle, such variable designs tend to be intricate and therefore may be less than optimal due in part to their relative cost and complexity.

SUMMARY OF THE INVENTION

Accordingly, a controllable hydrodynamic torque converter is provided for use within a vehicle, the torque converter having two stators each configured with a different outlet angle, with the second stator being selectively engageable with respect to the first stator for varying the torque converter K-factor depending on throttle position.

In one aspect of the invention, the second stator is selectively engageable using a clutch when the detectable throttle level is idle or high-throttle.

In another aspect of the invention, the first outlet angle of the first stator is at least 5 degrees less than the second outlet angle of the second stator, with the first outlet angle selected from the range of 10 to 65 degrees, and the second outlet angle selected from the range of 25 to 75 degrees.

In another aspect of the invention, a vehicle is provided having an engine having an engine torque and a detectable throttle level, a transmission, a torque converter operable to transmit the engine torque to the transmission and also having a stator assembly with first and second stators, a selectively controllable clutch, and a controller configured to selectively actuate the clutch depending on the detected vehicle throttle level, wherein actuation of the clutch locks the first and second stators to thereby vary the K-factor of the torque converter.

The above objects features and advantages, and other objects, features and advantages of the present invention are readily apparent from the following detailed description of the best mode for carrying out the invention when taken in connection with the accompanying drawings.

BRIEF DESCRIPTION OF THE DRAWINGS

FIG. 1 is a schematic plan view of a vehicle having a controllable dual-stator, variable K-factor torque converter according to the invention;

FIG. 2 is cutaway side view of the torque converter of the invention;

FIG. 3 is a schematic representation of low and high angle stator blades usable with the variable K-factor torque converter of the invention;

FIG. 4 is a performance curve of a low K-factor and a high K-factor torque converter; and FIG. 5 is a table describing the three vehicle operating modes or throttle positions in relation to the operation of clutch and dual stators of the invention.

DESCRIPTION OF THE PREFERRED EMBODIMENTS

Referring to FIG. 1, wherein like reference numerals refer to like components, a vehicle 10 is shown having a plurality of wheels 26 disposed or positioned on a pair of axles 22 and 24, an engine or energy conversion system 12, a hydrodynamic torque converter 14, and a power transmission 16 having a rotatable input member (not shown) and a rotatable output member 18. The energy conversion system 12 is preferably a gasoline or diesel internal combustion engine of the type known in the art, and is operable to generate a rotational force or torque suitable for rotating a crankshaft (not shown) that is selectively connectable or engageable with the input shaft of transmission 16 through the torque converter 14. However, any energy conversion capable of powering the vehicle 10 is also useable with the invention, for example fuel cells.

By means of the torque converter 14, torque from the energy conversion system is smoothly transferred to the transmission 16, and ultimately to the wheels 26 for propulsion of the vehicle 10. The torque converter 14 is preferably automatically controllable using a controller 30, preferably part of an on-board transmission control system also configured to detect a throttle position or level represented in FIG. 1 as "T" and in FIG. 5 as "throttle position", and adapted to selectively engage the energy conversion system 12 with the input shaft (not shown) of transmission 16 while also acting as a torque multiplier as needed, particularly at low or reduced vehicle speeds, as explained in more detail hereinbelow.

Depending on whether a front-wheel, rear-wheel, or all-wheel drive configuration is used, one or both axles 22 and 24 may be further adapted for use as drive axles suitable for powering the vehicle 10. To this end, a front and/or rear differential 20F, 20R, respectively, may be employed for transmitting output torque from the transmission 16 to either or both of the axles 22, 24, and/or for distributing output torque along a common axle 22 or 24, for example to prevent slippage on slippery pavement or while the vehicle 10 is cornering.

Turning to FIG. 2, the hydrodynamic torque converter 14 of the invention is shown in cutaway side view having an outer shell or cover 32 that is bolted, welded, or otherwise rigidly attached or connected to an engine flexplate (not shown), preferably using a lag 23, and having a centerline of rotation 11. The engine flexplate is ultimately attached to the engine crankshaft (not shown). The torque converter 14 includes an impeller or pump 50, a turbine 52 having a hub 33, and a stator assembly 44 selectively connectable to a fixed stator shaft (not shown) by means of a one-way clutch 19. The one-way clutch 19 is operable to hold torque in one direction, and may take the form of, for example, a mechanical diode, latch, or other suitable one-way clutching device. The pump 50 includes a pump housing 34 that is rigidly connected to the torque converter cover 32, preferably using a lag 21 or other suitable faster device or fastening method such as welding so that the pump 50 rotates in conjunction with and at the rate of the energy conversion system 12 (see FIG. 1). Torque converter 14 preferably includes a mechanical lock-up clutch 27 (see FIG. 2) for selectively directing power from the energy conversion system 12 to the transmission 16 when torque converter function is not desired, for example during periods of relatively high vehicle speeds. Cover 32 and housing 34 may be constructed using any suitable combination of ferrous and/or non-ferrous materials, depending on the design requirements.

As the pump 50 rotates in conjunction with the energy conversion system 12, a fluid 15 such as hydraulic oil or other suitable fluid is accelerated by and through the pump 50 and discharged or expelled into the turbine 52. The turbine 52 is operatively connected to a transmission input shaft (not shown) by means of a splined turbine hub 33, and configured to convert the fluid energy imparted by fluid 15 discharged from pump 50 into mechanical energy suitable for driving or rotating the transmission input shaft. This conversion to mechanical energy is enhanced when the blades (not shown) of turbine 52 are configured to discharge fluid 15 with rotational velocity opposite that of the pump 50. A stator assembly 44 is positioned between the inlet 71 of the pump 50 and the outlet 72 of the turbine 52 to receive fluid 15 discharged from the turbine 52 and conduct or redirect it back to the inlet of pump 50. Stator assembly 44 is further configured to variably and controllably redirect the fluid 15 flowing between the pump 50 and the turbine 52 imparting more or less rotational velocity in the direction of that of the pump 50, thereby improving the efficiency of the torque converter 14 and increasing torque multiplication.

Stator assembly 44 includes a first stator 45, a second stator 46, and a clutching mechanism or clutch 40, with first and second stators 45 and 46 being selectively and automatically engageable or connectable with respect to each other as needed using the clutch 40. First stator 45 is operatively connected to a fixed stator shaft (not shown) by means of a one-way clutch 19, which allows the stator assembly 44 to automatically freewheel when redirection of fluid 15 is not necessary. Clutch 40 is preferably a controllable, hydraulically-actuated piston or other suitable clutching device adapted to selectively engage, lock, or join together the first and second stators 45 and 46 in order to controllably and variably redirect fluid 15 between pump 50 and turbine 52 to thereby affect the performance of torque converter 14, as explained in more detail hereinbelow.

In accordance with the invention, fluid 15 flowing through the stator assembly 44 passes through the first stator 45, and subsequently through the second stator 46. The fluid 15 entering stator assembly 44 is forced to change direction and, upon exiting the first stator 45, enters the second stator 46 flowing in the same rotational direction as the pump 50. Depending on the position or actuation status of clutch 40, the fluid 15 may be forced to a higher speed of rotation in the same direction as pump 50, thereby conserving more or less power.

Clutch 40 is preferably powered or actuated by the pressurized fluid at 17 that is isolated or separate from fluid 15 and fed to the clutch 40 through an internal fluid passage or channel 48 from a controllable pressure source, such as a positive displacement pump (not shown) or other suitably controllable pressure source. Channel 48 is preferably cylindrical in shape and substantially circular in cross-sectional area, and adapted to efficiently conduct or direct oil or other hydraulic fluid, and may take the form of, for example, various die or sand cast channels or passages.

Turning now to FIG. 3, the plurality of first and second stator blades 60 and 62, respectively, are shown in developed sections. Stator blades 60 are disposed within the first stator 45, and stator blades 62 are disposed within the second stator 46. Each of the blades 60, 62 are configured to substantially reverse the direction of rotation of the fluid 15 upon entering the stator assembly 44. Fluid 15 flowing through the stator assembly 44 (see FIG. 2) passes through the first stator 45 and is acted on by the blades 60. Fluid 15 upon leaving or exiting stator 45 passes through stator 46. When clutch 40 is actuated or engaged, the fluid 15 is acted upon by blades 62. When clutch 40 is not actuated or engaged, blades 62 are released and are allowed to freewheel with negligible effect on the fluid 15. When the fluid 15 is acted upon by the blades 60, it is redirected in accordance with the geometry and construction of the blades 62.

In accordance with the invention, blades 60 and 62 have different respective geometrical sections and physical features that are selected to optimize the performance of the torque converter 14 under different vehicle operating conditions, for example, during idling, light-to-moderate or low/part throttle, and heavy throttle. Stator blades 60 of first stator 45 are constructed or configured to provide a relatively low fluid outlet angle, denoted as "L" for "low" herein and represented in FIG. 3 as $\theta_L$. Likewise, stator blades 62 of second stator 46 are constructed or configured to provide a relatively high fluid outlet angle, denoted as "H" for "high" herein and represented in FIG. 3 as $\theta_H$. Stator blades 62 of second stator 46 are preferably constructed or configured so as to admit fluid 15 discharged or expelled from first stator 45 at substantially the same angle, i.e. $\theta_L$, thereby minimizing losses and improving efficiency. In other words, the inlet angle of the second stator should match the outlet angle of the first stator. Once admitted into the second stator 46, the fluid 15 is redirected at the relatively high outlet angle $\theta_H$, with the terms "relatively low/high" referring to the angular relationship between the variables $\theta_L$ and $\theta_H$.

Turning now to FIG. 4, which shows a representative set of curves 70 that collectively describe torque converter efficiency, torque ratio, i.e. the output torque divided by the input torque, and K-factor, as explained previously hereinabove, in terms of its speed ratio, i.e. the output speed divided by the input speed. In general terms, if the outlet angle of a stator is relatively high, such as with $\theta_H$ of blades 62 (see FIG. 3), the torque converter 14 will have a proportionately higher K-factor. Such a torque converter is also referred to as a "loose" torque converter or, said differently, a loose converter has a relatively high K-factor. Loose torque converters also generally multiply torque to a relatively high speed ratio. Loose torque converters generally reduce fuel consumption at idle by reducing the amount of engine power absorbed by the torque converter as a consequence of the relatively high K-factor, while enhancing vehicle performance by multiplying torque to a higher vehicle speed.

Conversely, if the outlet angle of a stator is relatively low, such as with $\theta_L$ of blades 60, the K-factor will also be relatively low. Such a torque converter is also referred to as a "tight" converter, i.e. one having a low K-factor. Tight torque converters improve fuel economy during part throttle acceleration by reducing engine speed as a consequence of the relatively low K-factor. Accordingly, loose and tight torque converters are each optimal under different underlying vehicle operating conditions.

As shown in FIG. 4, the set of performance curves denoted with the subscript "L" describe the general performance of a "loose" torque converter, and the set of performance curves denoted with the subscript "T" describe the general performance of a "tight" torque converter, as described previously hereinabove. Referring to FIGS. 1, 4, and 5, during mode 1, i.e. when the throttle position or level T (see FIG. 1) as detected by the controller 30 indicates a vehicle "idle" condition, clutch 40 is automatically actuated or engaged (i.e. "X" in FIG. 4), thereby locking the second stator 46 with respect to the first stator 45. The variable K-factor of stator assembly 44 is increased to the value of the "loose" or L-curve (see FIG. 4), reducing the idle fuel consumption of the energy conversion system 12.

During mode 2, i.e. when the throttle position or level T indicates light or low/part throttle driving conditions, the clutch 40 is released or disengaged, thereby permitting the second stator 46 to rotate freely or freewheel without effect. In other words, the torque converter 14 will operate as if second stator 46 were not present, thus performing as a tight converter along the "T" curve collectively described by Torque Ratio$_T$, Efficiency or E$_T$, and K-Factor$_T$ in FIG. 4. The energy conversion system 12 (see FIG. 1) will operate at a reduced speed, thereby decreasing the engine brake specific fuel consumption (BFSC) and increasing fuel economy.

Finally, during mode 3, i.e. when the throttle position or level T indicates a "high" throttle driving condition, clutch 40 is once again engaged to lock the second stator 46 with the first stator 45, resulting in the torque converter 14 once again operating on the "loose" or L-curve. Vehicle 10 will then accelerate at a faster rate due to the higher torque multiplication afforded by the torque ratio L-curve at high speed ratios and the additional engine power permitted by the higher engine speed as a consequence of the higher K-factor L-curve. In this manner, torque converter 14 performance is optimized as the torque converter 14 is permitted to operate at its most efficient point across all three modes or throttle positions, levels, or conditions.

While the best modes for carrying out the invention have been described in detail, those familiar with the art to which this invention relates will recognize various alternative designs and embodiments for practicing the invention within the scope of the appended claims.

The invention claimed is:

1. A controllable hydrodynamic torque converter for use within a vehicle having a detectable throttle level, the torque converter comprising:
    a first stator having a first outlet angle;
    a second stator having a second outlet angle;
    a one-way clutch adapted for allowing the first stator and the second stator to freewheel when a redirection of fluid through the first stator and the second stator is not required; and
    a selectively actuatable clutch adapted for locking the first stator and the second stator at each of an idle throttle level and a high throttle level;
    wherein said second stator is selectively engageable with said first stator via the selectively actuatable clutch for varying the K-factor of the torque converter only when the detected throttle level is the idle throttle level or the high throttle level, and selectively disengageable from said first stator by releasing the selectively actuatable clutch only when the detected throttle level is a low or a part throttle level.

2. The torque converter of claim 1, wherein said selectively actuatable clutch is hydraulically-actuated, and wherein said torque converter includes at least one internal fluid channel adapted to deliver a supply of pressurized fluid to said selectively actuatable clutch for actuating said selectively actuatable clutch.

3. The torque converter of claim 1, wherein said first outlet angle is at least approximately 5 degrees less than said second outlet angle.

4. The torque converter of claim 3, wherein said first outlet angle is selected from the range of approximately 10 to 65 degrees and said second outlet angle is selected from the range of approximately 25 degree to 75 degrees.

5. The torque converter of claim 1, wherein said selectively actuatable clutch is a hydraulically-actuated clutch adapted to lock said second stator with said first stator.

6. The torque converter of claim 1, wherein the second stator has an inlet angle that substantially matches the outlet angle of said first stator.

7. A variable K-factor torque converter for use with a vehicle having a detectable throttle level, the torque converter comprising:
    a pump;
    a turbine;
    a stator assembly having a one-way clutch adapted to selectively redirect a supply of pressurized fluid between said pump and said turbine; and
    a selectively actuatable clutch;
    wherein said stator assembly comprises a first stator having a relatively low outlet angle and a second stator operable for selectively varying said K-factor when said selectively actuatable clutch is engaged only at each of two different first and second throttle levels to lock said first and said second stators, thereby varying a K-factor of the torque converter, wherein the first throttle level is idle and the second throttle level is high throttle, and wherein said second stator has a relatively high outlet angle when engaged with said first stator through said selectively actuatable clutch, and an inlet angle that substantially matches the outlet angle of said first stator.

8. The variable K-factor torque converter of claim 7, wherein said second stator freewheels with respect to said first stator when said second stator is not engaged through said selectively actuatable clutch.

9. The variable K-factor torque converter of claim 7, wherein said relatively low outlet angle is selected from the range of approximately 10 to 65 degrees and said relatively high outlet angle is selected from the range of approximately 25 degree to 75 degrees.

10. A vehicle comprising:
an engine having a measurable engine torque and a detectable throttle level;
a transmission;
a torque converter operable to transmit said engine torque to said transmission to propel said vehicle and having a stator assembly with first and second stators;
a one-way clutch adapted for allowing the first and the second stators to freewheel when a redirection of fluid through the stator assembly is not required; and a selectively actuatable clutch adapted for locking said first stator to said second stator when the throttle level is idle, and again when the throttle level is high, and for selectively unlocking said first stator from said second stator by releasing the selectively actuatable clutch when the throttle level is low or part throttle; and a controller configured to selectively actuate said selectively actuatable clutch depending on said detectable throttle level of said vehicle;

wherein actuation of said selectively actuatable clutch locks said first stator with said second stator to thereby vary the K-factor of said torque converter.

11. The vehicle of claim 10, wherein said first stator has a first outlet angle and said second stator has a second outlet angle, and wherein said first outlet angle is at least approximately 5 degrees less than said second outlet angle.

12. The vehicle of claim 11, wherein said first outlet angle is approximately 10 to 65 degrees, and wherein said second outlet angle is approximately 25 to 75 degrees.

13. The vehicle of claim 10, wherein said selectively actuatable clutch is hydraulically-actuated, and wherein said torque converter includes at least one internal fluid channel adapted to deliver a supply of pressurized fluid to said selectively actuatable clutch for actuating said selectively actuatable clutch.

* * * * *